(12) United States Patent
Lombard et al.

(10) Patent No.: US 8,029,235 B2
(45) Date of Patent: Oct. 4, 2011

(54) SHAPE DETAIL OF A PISTON TO AVOID JAMMING WITHIN A DISTORTED BORE

(75) Inventors: Alain Lombard, Uxgeney (FR); Jean Luc Perrin, Grimont (FR)

(73) Assignee: Honeywell International Inc., Morristown, NJ (US)

(*) Notice: Subject to any disclaimer, the term of this patent is extended or adjusted under 35 U.S.C. 154(b) by 1041 days.

(21) Appl. No.: 11/886,119

(22) PCT Filed: Mar. 11, 2005

(86) PCT No.: PCT/EP2005/003287
§ 371 (c)(1),
(2), (4) Date: Sep. 10, 2007

(87) PCT Pub. No.: WO2006/094532
PCT Pub. Date: Sep. 14, 2006

(65) Prior Publication Data
US 2008/0245228 A1 Oct. 9, 2008

(51) Int. Cl.
*F04D 29/46* (2006.01)
(52) U.S. Cl. .................................................. 415/158
(58) Field of Classification Search .................. 415/157, 415/158; 123/193.4; 92/162 R, 177
See application file for complete search history.

(56) References Cited

U.S. PATENT DOCUMENTS

| 1,824,157 A | 5/1929 | King |
| 2,841,359 A | 7/1958 | Berck |
| 4,776,168 A | 10/1988 | Woollenweber |
| 5,172,626 A * | 12/1992 | Hart ............................... 92/177 |

FOREIGN PATENT DOCUMENTS

| CH | 110221 | 4/1924 |
| FR | 490286 | 5/1918 |
| JP | 08334055 | 6/1995 |
| JP | 08334055 A * | 12/1996 |

OTHER PUBLICATIONS

ISR/WP Honeywell.

* cited by examiner

*Primary Examiner* — Richard Edgar
(74) *Attorney, Agent, or Firm* — Alston & Bird LLP (57) ABSTRACT

A piston (21; 104) to be mounted inside a cylindrical bore (46; 117) has a cylindrical surface (32; 114) provided with at least one axially extending deepening (31; 116) for accommodating a thermal distortion of the cylindrical bore (46; 117). Preferably, the piston is used in a piston valve as a valve control member or turbine as a variable nozzle control member.

13 Claims, 7 Drawing Sheets

SHAPE DETAIL OF A PISTON TO AVOID JAMMING WITHIN A DISTORTED BORE

The present invention relates to a piston for moving inside a piston bore and particularly to a special piston shape for avoiding jamming of the piston when the piston bore is distorted.

Pistons for moving inside piston bores are commonly known in different technical fields. For example, pistons are used in combustion engines and are moved inside the cylinders as piston bores. Such an engine piston generally comprises a piston head and a piston skirt, wherein the piston head is cross-sectionally defined by a circular disc whereas the piston skirt is defined by a hollow cross section.

As explained in the European Patent Application EP 529 714 A1, engine pistons are exposed to thermal growth such that lateral and tilting movements of the piston may cause noise and wear. A common solution to this problem resides in providing a piston skirt having a generally oval configuration in its lateral cross-section. Furthermore, the EP 529 714 A1 proposes to provide the piston skirt with a transverse cross-sectional shape or skirt profile which is formed by smoothly varying radii and includes the provision of slight concavities or relative recesses along the thrust plane of the piston skirt.

Furthermore, in the technical field of turbochargers, variable geometry turbines are commonly used. One type of variable geometry turbines comprises a floating insert as a piston which is slidably mounted in a bore of a turbine housing accommodating a turbine wheel. The turbine wheel is driven by exhaust gas coming from an engine and is driving a compressor wheel for compressing fresh air to be supplied to combustion cylinders of the engine. The floating insert forms an annular nozzle or passage for passing the exhaust gas to the turbine wheel. By axially moving the floating insert, the sectional area of the nozzle can be adjusted according to an operational condition of the engine.

Furthermore, also in the technical field of turbochargers, piston valves are used in multistage turbocharger systems having a plurality of turbines. Therein, the piston valves are used for controlling the exhaust gas flow to the respective turbines by axially moving a piston in a bore provided by a portion of a housing of the piston valve. By an appropriate control of the exhaust gas flow to the respective turbines, the operational range or map width of the turbocharger system is improved.

In the above described variable geometry turbine as well as in the piston valves there may occur a state in which the portion of the housing providing the bore which accommodates the piston is thermally deformed. In this state, the piston may be hindered in its axial movability because the clearance between the piston and the bore is drastically reduced.

The GB 2 146 096 A discloses a refrigerator having a piston sleeve moving within a piston housing. A large gap is provided between the sleeve and the piston housing so as to compensate for misalignment or distortions of the piston housing.

However, in the technical field of variable geometry turbines or piston valves as described above, such a large gap is not welcome as it would impact the all stack up of the parts.

Thus, there is a need for improving a piston/bore arrangement with which the hindering of the movement of the piston upon a thermal deformation of the bore can be prevented.

According to the invention, the above need is met with a piston having the features of claim 1, a piston-bore arrangement according to claim 9, a valve according to claim 12 and a turbocharger according to claim 13.

According to a first aspect of the invention, a piston to be mounted inside a cylindrical bore has a cylindrical surface provided with at least one axially extending deepening for accommodating a thermal distortion of the cylindrical bore. Thus, when the piston is mounted inside a bore of a portion of a turbine housing or of a valve housing, for example, which is thermally distorted, a portion of an inner wall defining the bore, which portion is radially contracted due to the thermal distortion, can be accommodated in the deepening of the piston. Thus, the piston does not interfere with the inner wall defining the bore such that an axial movement of the piston is not hindered. Furthermore, with such a piston, it is not necessary to increase a clearance between the piston and the inner wall defining the bore.

Preferably, the deepening is formed by a portion having convexity lower than the rest of the cylindrical surface. Furthermore, the deepening can be formed by an axially extending concave portion. The deepening may also be formed by an axially extending recess. This recess may be formed by an axially extending segment-like cut-out portion. All theses shapes of the deepening can easily be formed in the piston, e.g. by a machining process.

Additionally, the piston may be hollow and one end of the hollow piston may be provided with a stiffened portion which radially stiffens the hollow piston. Preferably, this stiffened portion comprises at least three spokes providing a passage of fluid through the hollow piston. Thus, the piston is especially appropriate to be used in a piston valve or in a turbine having a variable nozzle which is controlled by the piston because in these applications it is important that a fluid, e.g. exhaust gas, can flow through the piston.

Preferably, the deepening of the piston is at least provided at a position axially adjacent to the stiffened portion. Namely, when the bore, in which the hollow piston is mounted, is thermally distorted, the hollow piston may also be distorted at non-stiffened portions thereof. Thus, when the hollow piston is distorted or deformed similar to the deformation of the bore, a jamming or sticking problem may not be this relevant at the non-stiffened portions. However, the portion of the piston which is axially adjacent to the stiffened portion is much stiffer in the radial direction and cannot follow the thermal distortion of the bore. Thus, with the deepening of the piston being at least provided at a position axially adjacent to the stiffened portion, an inference between the piston and the thermally distorted bore can be avoided and the piston can reliably be moved inside the bore.

According to another aspect of the invention, a piston-bore arrangement is equipped with a piston as described above and said piston is rotatably mounted inside said bore and comprises an odd number of deepenings. Thus, when the bore is thermally distorted, the piston can be rotated to a position in which a radially inwardly contracted portion of the wall defining the bore is accommodated in one of the deepenings while a non-deepened portion of the piston securely slides along an inner wall portion of the distorted bore. Thereby, the axial movement of the piston is not hindered by the thermal distortion of the bore such that jamming or sticking of the piston is reliably avoided. Furthermore, by uniformly arraying the deepenings in the circumferential direction, a good part centering will be obtained.

According to still another aspect of the present invention, a piston-bore arrangement is equipped with a piston as described above, wherein the piston is not rotatable inside said bore and is provided with a deepening/deepenings facing the thermally collapsing portion/portions of said bore. Thus, when the thermal distortion characteristic of the bore is known, the piston-bore assembly can be designed such that the thermal distortion of the bore can be accommodated in the deepening of the piston. As a result, the axial movement of the piston is not hindered by a wall portion of the bore such that jamming or sticking of the piston is reliably avoided.

Preferably, said bore of the piston-bore assembly is constituted by a thin-walled housing portion. In this case, the piston according to the invention is especially effective since a thin-walled housing is more likely to be thermally distorted as compared to a large, solid element providing the bore.

Furthermore, the deepening may, with respect to the axial direction of the piston, at least be provided in a portion of the piston which corresponds to a position of the piston at which the piston is guided in its movement. Namely, there may be an arrangement in which the piston is longer than the bore or in which only a part of the piston is moved inside the bore while another part of the piston never enters the bore. In this case, it is not necessary to provide the deepening also in the portion of the piston which never enters the bore.

According to another aspect of the present invention, a valve comprises a piston-bore arrangement as described above, wherein the piston serves as a valve control member. With such an arrangement, the jamming or sticking of the piston as the valve control member can reliably be avoided. As a result, the operability of the valve is not affected by thermal influences like a thermal distortion of a member of the valve which provides the bore for the piston.

According to yet another aspect of the present invention, a turbocharger comprises a piston-bore arrangement as described above, wherein said piston serves as a variable nozzle control member accommodated inside a turbine housing of the turbocharger. With such an arrangement, the jamming or sticking of the piston as the variable nozzle control member can reliably be avoided. As a result, the operability of the turbocharger is not affected by thermal influences like a thermal distortion of a member of the turbocharger, e.g. the turbine housing, which provides the bore for the piston.

Further features and advantages of the invention will become apparent from the description that follows with reference being made to the enclosed drawings, in which.

Figure 1:
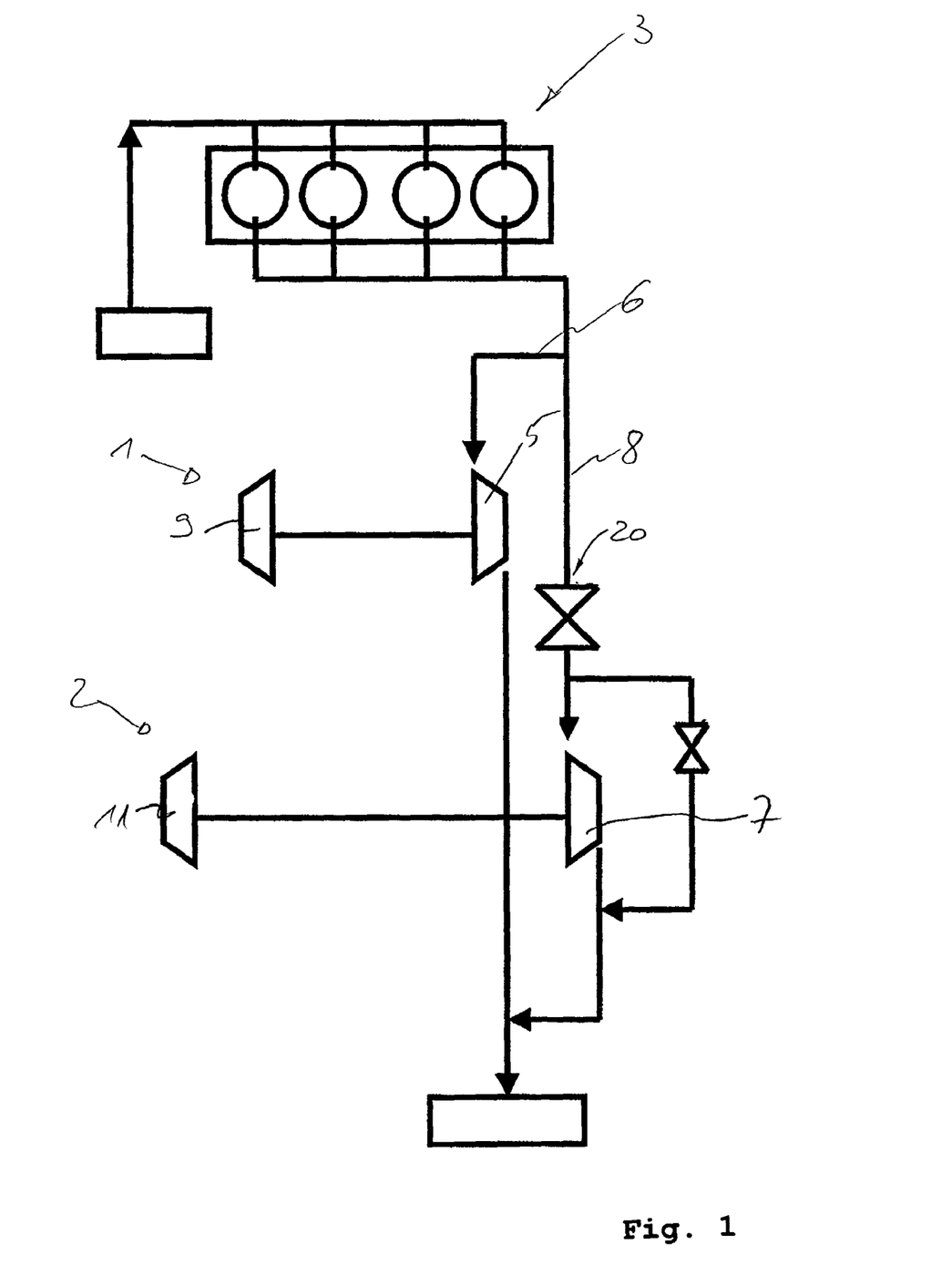
FIG. 1 illustrates a layout of a turbocharger system in which a piston valve having a piston according to the invention is used.

The layout of FIG. 1 shows a turbocharger system of an internal combustion engine comprising a first turbocharger 1 and a second turbocharger 2, wherein at the turbine's sides of the layout two compressors 9 and 11 are connected in parallel for being driven by an exhaust gas of an internal combustion engine 3. As shown in the drawing, each turbocharger is equipped with a turbine 5, 7 and a corresponding compressor 9, 11, respectively. The exhaust gas from the engine is fed in parallel to each of the turbines by means of a first exhaust conduit 6 and second exhaust conduit 8. The exhaust gas supplied to the turbine 7 can be controlled by a valve 20.

An embodiment of a piston valve having a piston according to the invention and serving for the above purpose is particularly illustrated by FIGS. 2 to 6. In the Figures, only the essential elements of the piston valve are shown, whereas self-evident, accessory elements of the piston valve have been omitted.

Figure 2:
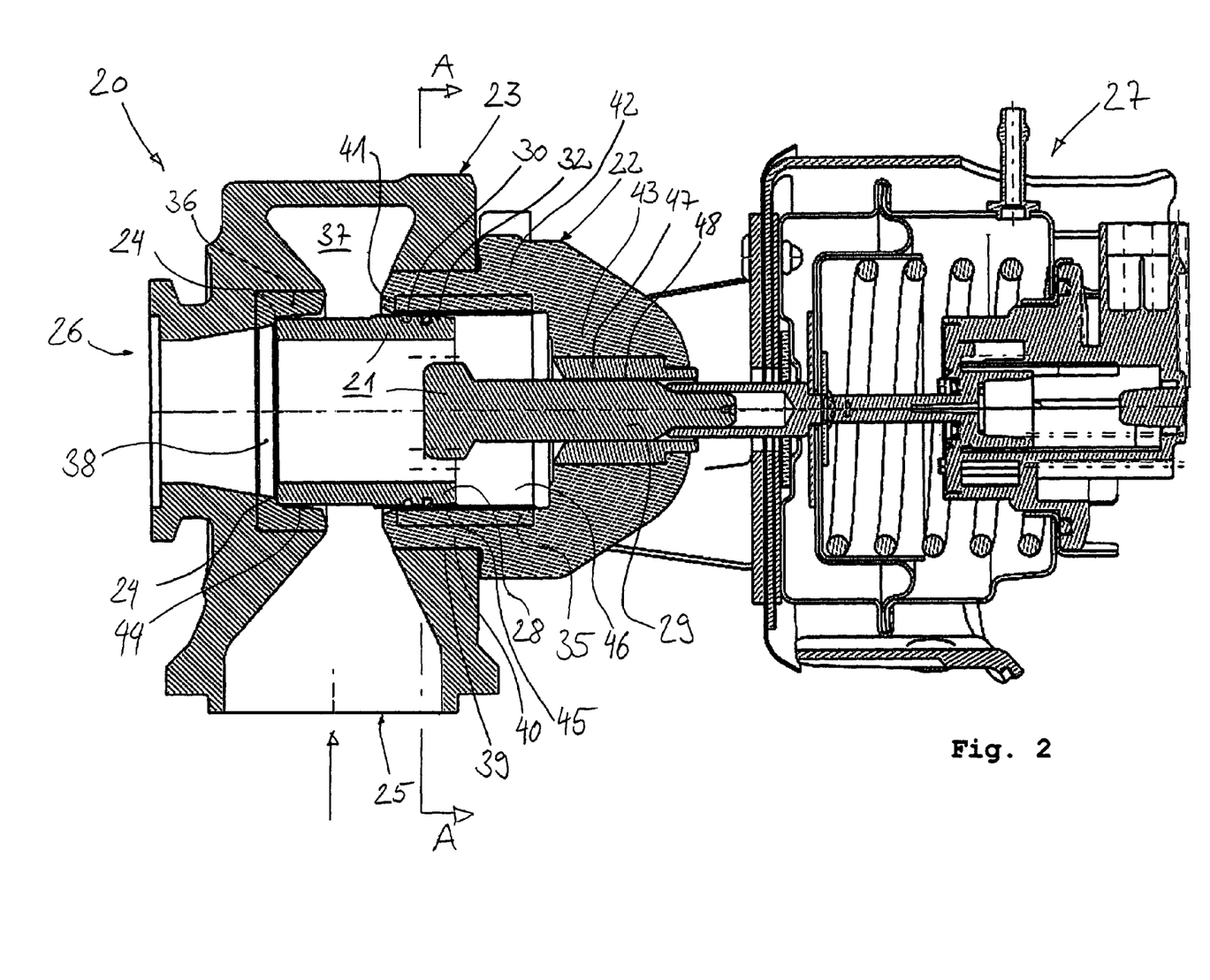
FIG. 2 shows a sectional view of the piston valve used in the turbocharger system of FIG. 1 as a first embodiment, the piston valve having a piston axially moving in a bore.

The piston valve 20 shown in FIG. 2 substantially comprises a main housing 23, a piston housing 22 and a piston 21. The main housing 23 defines an inlet 25 for exhaust gas coming from the engine and an outlet 26 capable of leading the exhaust gas to the turbine 7 of the turbocharger 2. The exhaust gas is led from the inlet 25 to a volute portion 37 being formed within the main housing 23 and surrounding a central area of the main housing 23. Furthermore, a valve seat member 36 is provided in the central area of the main housing portion 23 and brings the volute portion 37 in communication with the outlet 26 through a circular hole 38 of the valve seat member 36. The valve seat member 36 forms an annular valve seat 24 around the circular hole 38 at its volute portion side. A later described piston 21 can be seated onto the annular valve seat 24 so as to close the circular hole 38 thus shutting off the communication between the volute portion 37 and the outlet 26. Furthermore, the main housing 23 includes an insert hole 39 on its side opposite to the outlet 26. A portion of the piston housing 22 is inserted into the insert hole 39 so as to connect the piston housing 22 to the main housing 23.

The piston housing 22 is substantially cup shaped and has a cylindrical wall portion 42 and a bottom portion 43. The cylindrical wall portion 42 comprises at its open end an insert portion 40 having a smaller outer diameter as compared to the remainder of the cylindrical portion 42. An annular wall projection is 41 projecting radially inwardly from the distal end of the insert portion 40. The length of the insert portion 40 and the depth of the insert hole 39 of the main housing 23 are configured such that the distal end of the insert portion 40 is aligned with the volute portion 37 of the main housing 23.

Furthermore, a liner 35 is inserted into the inner circumferential portion of the cylindrical wall portion 42 of the piston housing 22 and serves as a slide bearing for the piston 21. The liner 35 is axially held inside the cylindrical wall portion 42 by means of the annular wall projection 41 and the bottom portion 43. The liner 35 defines, together with the bottom portion 43, a piston bore 46 inside the piston housing 22.

The piston 21 comprises a piston sleeve 28 seatable onto the valve seat 24 for opening and closing the circular hole 38, and a piston shaft 29 for transmitting a driving force of an external actuator 27 to the piston sleeve 28. The piston sleeve 28 is fit into the bore defined by the liner 35 of the piston housing 22 and can be axially moved therein. Furthermore, the piston sleeve 22 comprises at its outer circumferential surface a contact surface portion 32 which axially extends in the rear part of the piston sleeve 28, i.e. at the side of the piston shaft. This is, in this embodiment, the contact surface portion 32 does not extend over the whole length of the piston sleeve 28.

The piston shaft 29 penetrates the bottom portion 43 of the piston housing 22 through a hole 48 and is connected to the external actuator 27 which is mounted to an outer portion of the piston housing 22. The external actuator 27 can be an electric actuator or a pneumatic actuator which drives the piston 21 depending on operation conditions of the engine. A gap between the piston shaft 29 and the inner circumferential surface portion of the hole 48 is sealed by a seal 47. Furthermore, the piston shaft 29 is connected to the external actuator 27 such that the piston 21 as a whole is rotatable about its center axis.

Figure 4:
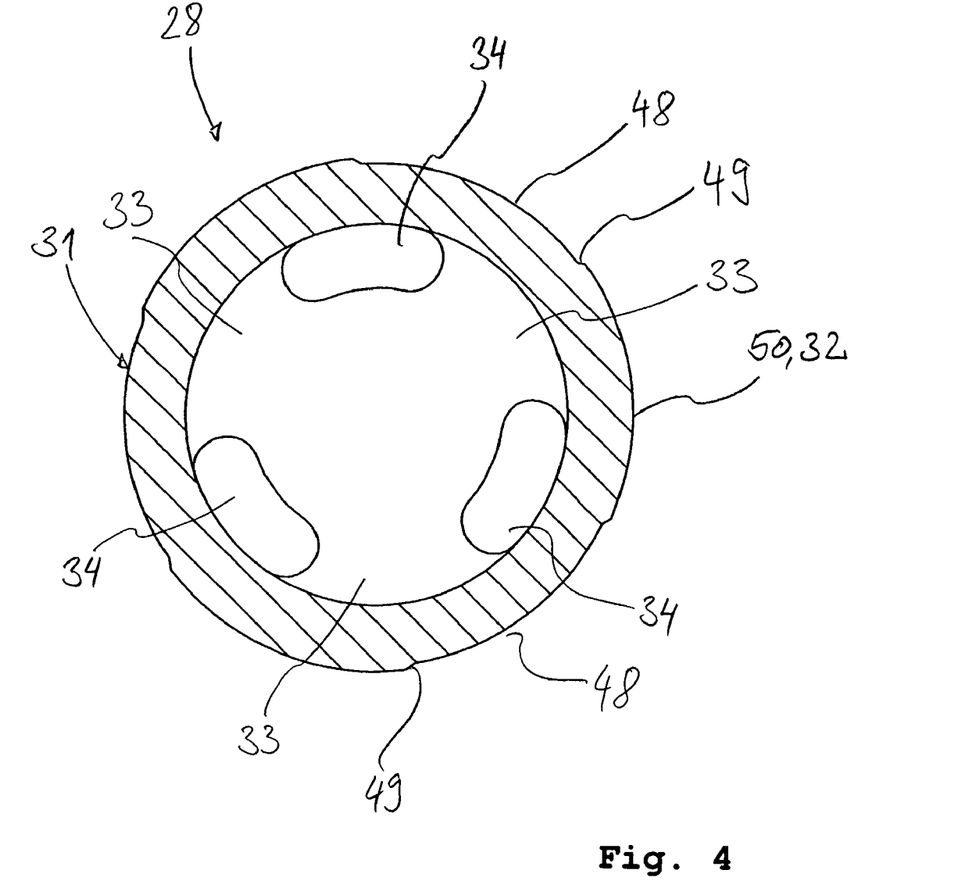
FIG. 4 shows a cross sectional view through the piston along a line A-A in FIG. 2.

As can best be seen in FIG. 4, which is a cross-sectional view through the contact surface portion 32 of the piston sleeve 28, the piston sleeve 28 is connected to the piston shaft 29 via three spokes 33. Thus, piston holes 34 are generated between the spokes 33 so as not to establish a closed space between the piston sleeve 28, the liner 35 and the bottom portion 43 of the piston housing 22 which would restrict the piston 21 in its moving performance. Furthermore, the spokes act as a stiffening element which radially stiffens the piston sleeve 28 at its connection portion to the piston shaft 29.

With reference back to FIG. 2, the piston sleeve 28 is provided with circumferentially extending grooves 30 in its contact surface portion 32 for receiving piston rings which seal between the contact surface portion 32 and the liner 35 so as to prevent exhaust gas from entering the piston bore 46 when the piston 21 is in its later described closed position.

With the described configuration, the piston 21 can be moved to a fully closed position in which the front end portion of the piston sleeve 28 is seated onto the valve seat 24 so as to shut-off the communication between the volute portion 37 and the outlet 26. Furthermore, when the piston 21 is driven to move in the right direction of FIG. 2, the piston sleeve 28 is lifted from the valve seat 24 such that an annular flow passage 44 defined by the valve seat member 36 and the piston sleeve 28 allows a flow of exhaust gas from the inlet 25 through the volute portion 37 and the opening 38 to the outlet 26. The opening degree of the annular flow passage 44 and thus the amount of exhaust gas flow depends on the axial moving amount of the piston 21.

Figure 3:
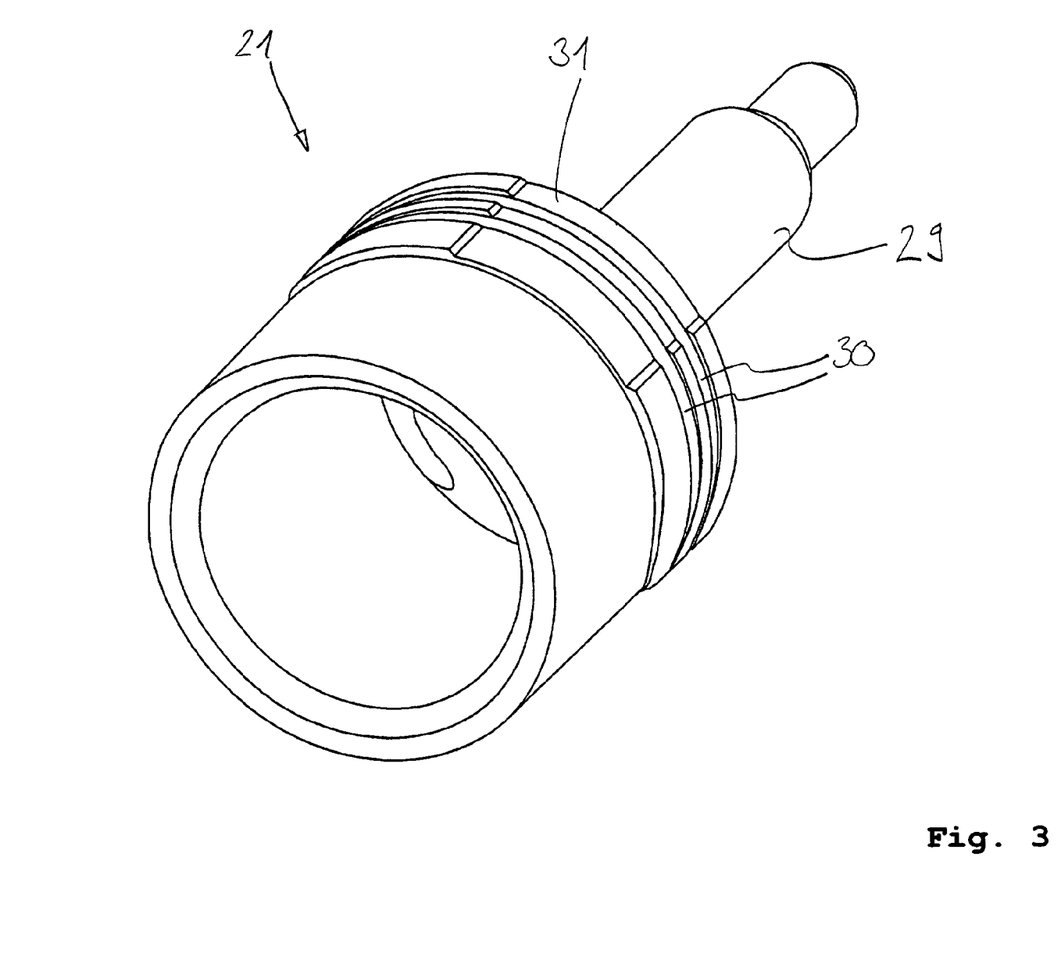
FIG. 3 illustrates the shape of the piston used in the piston valve of FIG. 2.

Now, with reference to FIGS. 3 and 4, a shape of the outer circumferential surface portion of the piston sleeve 28 is described. The outer circumferential surface portion of the piston sleeve 28 comprises a lower portion at the front end of the piston sleeve 28 and an elevated portion at the rear end of the piston sleeve 28. The elevated portion forms the contact surface portion 32 having outer contact surfaces 50 interrupted in the axial direction of the piston sleeve 28 by the circumferentially extending grooves 30 for accommodating the piston rings.

Furthermore, the contact surface portion 32 is provided with three axially extending recesses 31 as deepenings, one of which is shown in FIG. 3. The recess 31 axially extends over the whole length or axial extent of the contact surface portion 32. Thus, a contour or outline of the piston sleeve 28, when seen in the axial direction, is cut radially inwardly by the recesses 31 as can best be seen in FIG. 4.

Back to FIG. 3, as already mentioned, the recess 31 extends over the whole axial length of the contact surface portion 32. Thus, the recess 31 also extends over the circumferentially extending grooves 30 of the contact surface portion 32 such that the recess can be regarded as being separated by the grooves 30. However, with respect to the later described functionality of the recess 31, the separated recess acts as one recess.

Figure 5:
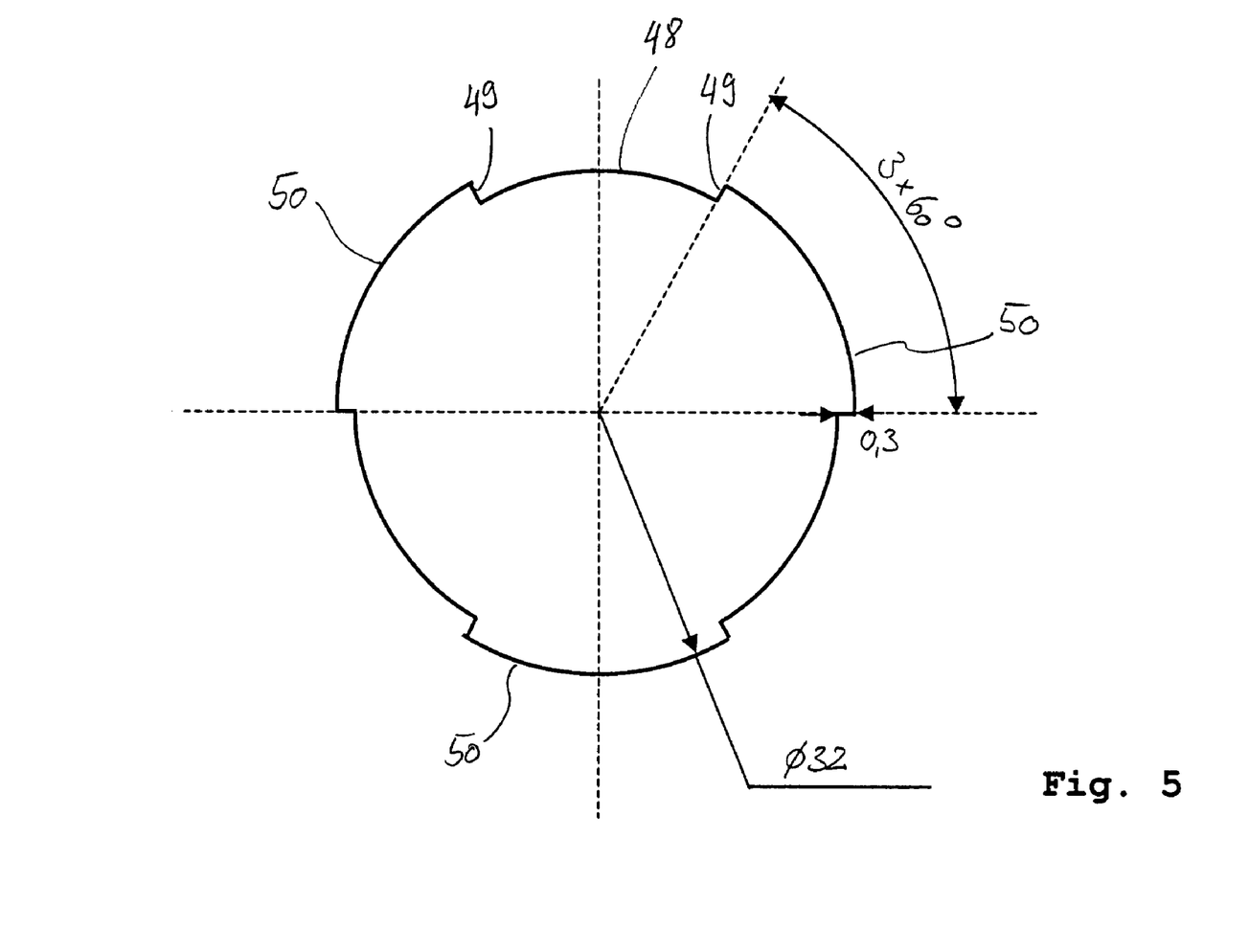
FIG. 5 shows a detailed configuration of the cross-sectional contour of the piston.

As can best be seen in FIG. 5, the cross-sectional shape of the recess 31 is substantially defined by a bottom surface 48 and wall surfaces 49, such that the cross-sectional shape of the recess 31 substantially corresponds to a segment-like cut-out portion. The bottom surface 48 is defined by a circularly curved surface being coaxial to the contact surface 50. In other words, the bottom surface has a convexity lower than the rest of the cylindrical surface. The wall surfaces 49 are inclined to the radial direction of the piston sleeve 28 and form obtuse angles with tangents of the respective contact surface 50 and bottom surface 48.

In the present embodiment, three recesses 31 and three contact surfaces 50 are alternatingly arrayed in the circumferential direction of the piston sleeve 28. Thus, the circumferential extent of each of the recesses 31 and contact surfaces 50 is respectively defined by a cross-sectional segment portion of the piston sleeve 28 opening at a central angle of 60°. The diametrical dimension of the piston sleeve at the contact surface 50 is 32 cm while the depth of the recess 31 is 0.3 cm.

Figure 6:
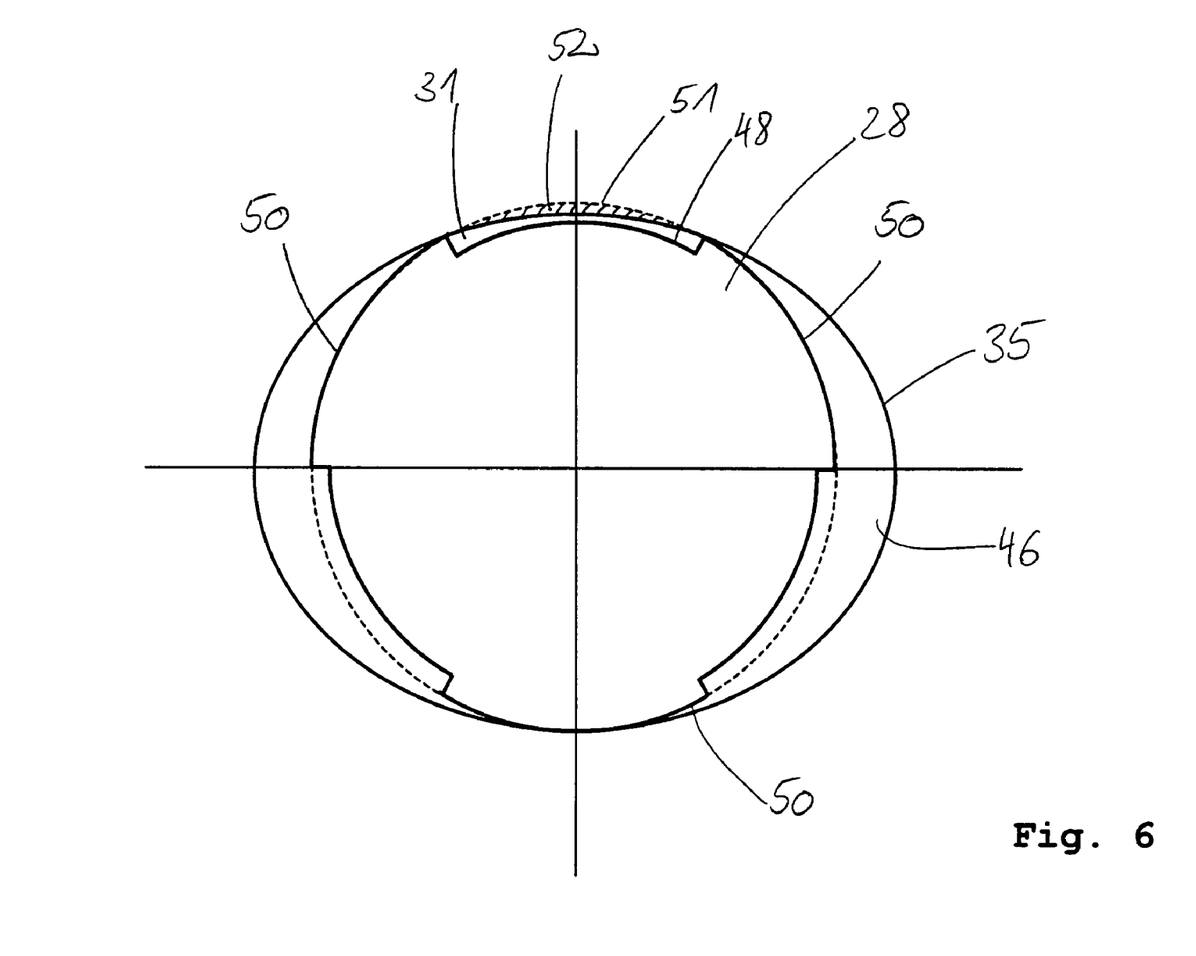
FIG. 6 shows a schematic diagram illustrating the operating mode of the piston according to the present invention with respect to the bore.

Now, the operation mode of the piston 21 according to the present embodiment with respect to its sliding motion inside the piston bore 46 is explained on FIG. 6 which schematically shows an piston-bore arrangement of the piston sleeve 28 and the piston bore 46.

FIG. 6 shows a state of the piston-bore arrangement in which the liner 35 defining the piston bore 46 is thermally deformed or distorted, for example due to thermal deformation of the piston valve housings 22 and 23. Thus, the cross-sectional shape of the liner 35 becomes substantially oval such that also the inner surface of the liner 35, along which the contact surfaces of the piston sleeve 28 are sliding, become substantially oval. Thus, with respect to the non-deformed shape, the liner 35 is relatively expanded in the horizontal direction of FIG. 6 while being relatively contracted in the vertical direction of FIG. 6. Since the piston 21 is rotatable relative to the liner 35, the piston sleeve 28 can follow the deformation of the liner 35 by rotating to the state shown in FIG. 6 in which one of the recesses 31 of the piston sleeve 28 receives a radially contracted portion of the liner 35. In this state, the contact surface 50, which is radially opposed to the recess 31 receiving the contracted portion of the liner 35, is still in surface contact with the liner 35 such that the piston 21 can smoothly slide in the piston bore 46 without any jamming.

Furthermore, FIG. 6 shows dashed lines 51 representing a circularly outlined piston sleeve without any recesses being provided in its contact surface portion. A hatched area 52 corresponds to an virtual intersectional volume portion 52 generated when intersecting the deformed liner 35 with the circularly outlined piston. However, in reality such a virtual intersectional volume portion 52 would not be generated since a deformation of the liner 35 would be hindered by the circularly outlined piston sleeve. Instead, the hindered deformation of the liner would result in an highly increased pressure at locations between the piston sleeve and the liner 35 where the deformation of the liner tends to occur. As a result, the hindered deformation of the liner 35 would lead to a jamming or sticking of the piston inside the liner 35.

However, according to the present embodiment, the portion of the liner 35 which is contracted due to its thermal deformation can be received or accommodated in the recess 31. Thus, the above-mentioned highly increased pressure at locations between the piston and the liner 35 can be avoided. As a result, the piston sleeve 28 can smoothly move inside the oval piston bore 46 defined by the deformed liner 35 without any jamming or sticking of the piston 21 occurring.

Figure 7:
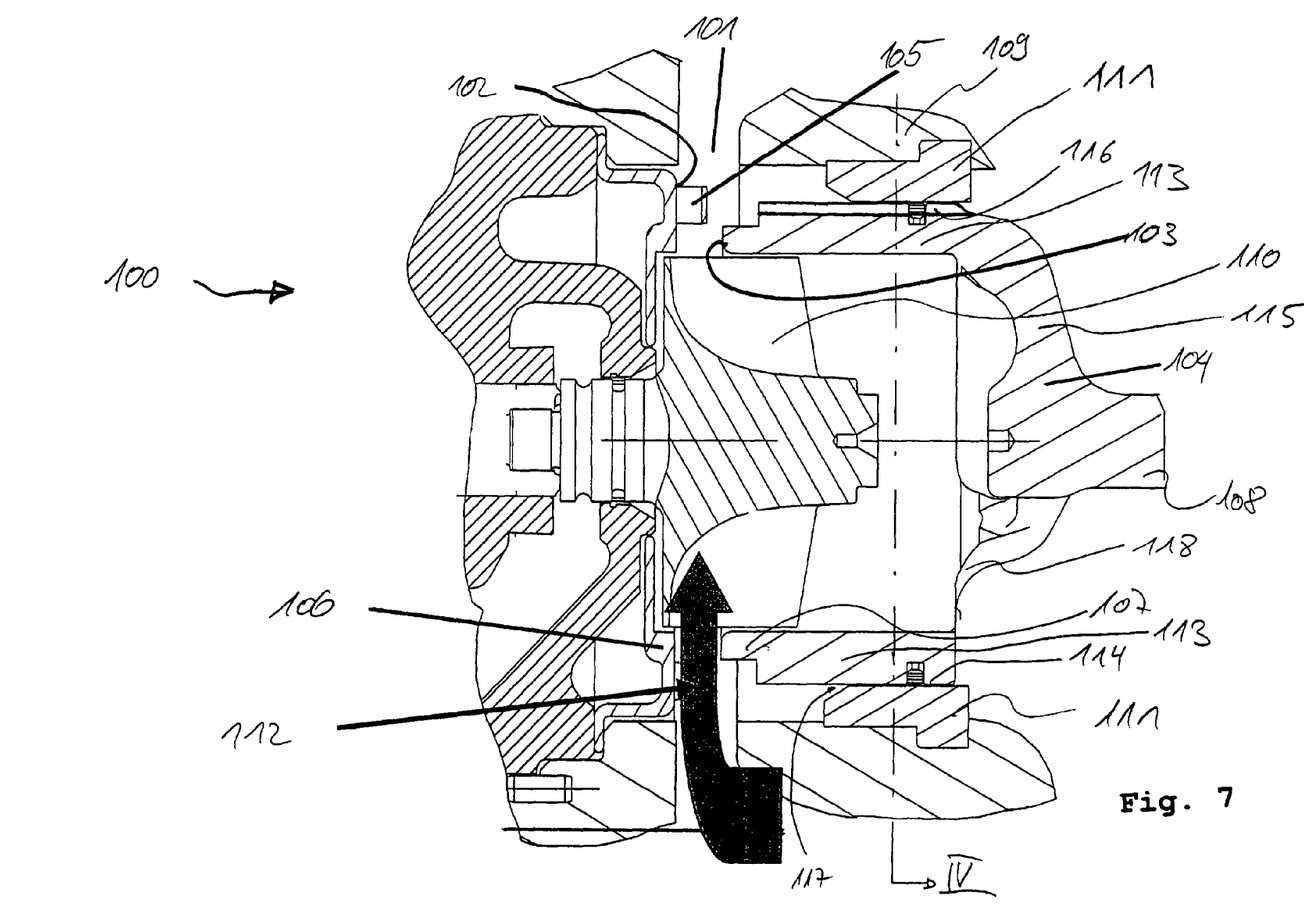
FIG. 7 shows a cross-sectional view through a portion of a turbocharger as a second embodiment using the piston according to the invention.

Now, a second embodiment of the invention is described with reference being made to FIG. 7 which shows a cross-sectional view through a portion of a turbocharger having a piston according to the invention.

The turbocharger 100 according to this embodiment substantially comprises an exhaust gas driven turbine wheel 110 accommodated in a turbine housing 109 and a compressor wheel (not shown) accommodated in a compressor housing (not shown). The compressor wheel is driven by the turbine wheel via a common shaft so as to supply intake air under pressure to combustion chambers of an engine (not shown).

The turbine housing 109 comprises an exhaust gas inlet (not shown) and a volute (not shown) which leads the exhaust gas coming from the engine to the turbine wheel 110 via a variable annular nozzle 101. The variable annular nozzle 101 is defined between an inboard wall 102 and an outboard wall 103 of the turbine, wherein said outboard wall 103 is provided by an axially movable tube-shaped piston 104 and is thus axially moveable with respect to the inboard wall 102. An opening degree of the annular nozzle 101 is defined by the variable distance between the inboard wall 102 and the outboard wall 103.

The inboard wall 102 is constituted by a vaned shroud 106 having an annular arrangement of fixed vanes 105 thereon. Thus, the fixed vanes are interposed in said variable annular nozzle 101 to force the flow of exhaust gas 112 into a predetermined direction.

The tube-shaped piston 104 has a stepped portion 107 at a distal end thereof which constitutes the outboard wall 103. The stepped portion 107 provides a small diameter portion the dimensions of which allow an axial movement of the stepped portion 107 into a radial inside of the vanes. Thus, the variable nozzle 101 can accurately be fully closed by moving the tube-shaped piston 104 towards the inboard wall 102.

The tube-shaped piston 104 includes a cylinder portion 113 providing a contact surface portion 114 and a driving rod 108 connected to an external actuator (not shown) for driving the tube-shaped piston in an axial direction. The axial movement of the piston 104 is guided by the contact surface portion 114 sliding on a liner 111 mounted to the circumferential inside of a cylindrical bore of the turbine housing 109. The liner 111 defines a piston bore 117 in its inside in which the piston 104 moves. A connecting portion 115 connects the driving rod 108 to the cylinder portion 113 by means of spokes 118. The spokes 118 act as a stiffening portion which radially stiffens the cylinder portion 113 of the piston 104. Through holes (not shown) between the spokes 118 of the connecting portion 115 allow the exhaust gas coming from the variable nozzle 101 and driving the turbine wheel 110 to be discharged from the turbine housing 109, i.e. from the inside of the piston 104. The axial length of the cylinder portion 113 extends from the connecting portion 115 to the beginning of the stepped portion 107.

The cylinder portion 113 is provided with three recesses 116 which extend along the whole length of the cylinder portion 113 and which are uniformly arrayed in the circumferential direction of the cylinder portion 113. Accordingly, in the cross-sectional view of FIG. 7 only one of the recesses 116 is visible.

The cross-sectional shape of the piston 104 corresponds substantially to that of the valve piston shown in FIG. 4 and explained in the first embodiment.

As a result of the recesses 116, substantially the same effects as those in the first embodiment can be obtained with the piston according to the second embodiment. Namely, when the turbine housing 109 is thermally deformed into an oval shape, the inwardly contracted portions of the liner 111 can be accommodated or received in one of the recesses 116 such that a sticking or jamming of the piston does not occur. Thus, a proper movability of the piston 104 can be maintained and an appropriate control of the exhaust gas flow to the turbine wheel can be carried out.

The invention is not limited to the above described embodiment and modifications within the scope of protection are possible.

For example, the number of axially extending recesses of the piston sleeve is not limited to three. Namely, the number of recesses depends on the necessary circumferential extent of the recess which is necessary for the smooth functionality of the piston in the deformed liner. As can be gathered from FIG. 6, the circumferential extent of the recess corresponds at least to the circumferential extent of the above-described virtual intersectional volume portion 52. This circumferential extent depends on the deformation characteristic of the liner 35, 111 and/or the housing portions 22, 23 and 109 which characteristics can be analyzed previously. Thus, when the analyses results in that a shorter circumferential extent of the recess is sufficient, the number of recesses can be increased. The more recesses the piston has, the faster the piston can be moved to a position in which the recess accommodates the deformation of the bore. In any case, it is advantageous to have an odd number of recesses and contact surfaces which are respectively arrayed by an uniform interval in the circumferential direction of the piston sleeve. This secures that each recess is radially opposed to a contact surface which is advantageous in view of the sliding performance of the piston within the deformed liner.

Furthermore, with respect to the second embodiment, the recesses 116 do not need to extend along the whole axial extent of the cylinder portion 113. For example, as can be seen in FIG. 7, the range by which the cylinder portion 116 slides along the liner 111 does not extend over the whole axial length of the cylinder portion 113. In other words, the range in which the deformation of the liner 111 could be in interference with the outline of the cylindrical portion 113 only extends along a certain axial length of the cylindrical portion 113. Thus, in this case, the provision of the recesses 116 in a part of the cylindrical portion 113 in which the inference with the bore could occur is sufficient.

Furthermore, the number of spokes is not limited to three. As a matter of course more or less spokes are possible.

Furthermore, the piston according to the invention is suitable to all applications in which a piston slides within a piston bore. The inventive piston is especially effective in case the piston bore is defined in a housing portion which is likely to be deformed, for example due to thermal influences.

The invention claimed is:

1. A piston and cylinder assembly, comprising:
   a cylinder defining a cylindrical bore, and
   a piston having a cylindrical contact surface portion, the piston being received in the cylindrical bore and being axially movable therein, the axial movement of the piston in said cylindrical bore being guided by the cylindrical contact surface portion sliding along the cylindrical bore, wherein said cylindrical contact surface portion is provided with at least three deepenings extending over the entire axial extent of said cylindrical contact surface portion such that, in use of the piston, a thermal distortion of the cylindrical bore is accommodated in one of the deepenings so as not to hinder an axial movement of the piston.

2. A piston and cylinder assembly according to claim 1, wherein said deepenings are formed by portions having convexity lower than the rest of the cylindrical surface.

3. A piston and cylinder assembly according to claim 1, wherein said deepenings are formed by axially extending concave portions.

4. A piston and cylinder assembly according to claim 1, wherein said deepenings are formed by axially extending recesses.

5. A piston and cylinder assembly according to claim 4, wherein said recesses are formed by axially extending segment-like cut-out portions.

6. A piston and cylinder assembly according to claim 1, wherein the piston is hollow, and one end of the hollow piston is provided with a stiffened portion that radially stiffens the hollow piston.

7. A piston and cylinder assembly according to claim 6, wherein the stiffened portion comprises at least three spokes providing a passage of fluid through the hollow piston.

8. A piston and cylinder assembly according to claim 6, wherein one of said deepenings is provided at a position of the piston axially adjacent to said stiffened portion.

9. A piston and cylinder assembly according to claim 1, wherein said piston is rotatably mounted inside said bore and comprises an odd number of deepenings.

10. A piston and cylinder assembly according to claim 1, wherein said piston is not rotatable inside said bore and is arranged such that at least one of the deepenings faces a thermally collapsing portion of said bore.

11. A piston and cylinder assembly according to claim 1, wherein said bore is constituted by a thin-walled housing portion.

12. A valve comprising a piston and cylinder assembly according to claim 1, wherein said piston serves as a valve control member.

13. A turbocharger comprising a piston and cylinder assembly according to claim 1, wherein said piston serves as a variable nozzle control member accommodated inside a turbine housing of the turbocharger.

* * * * *